United States Patent
Kang et al.

(10) Patent No.: US 8,407,764 B2
(45) Date of Patent: Mar. 26, 2013

(54) USER AUTHENTICATION APPARATUS AND METHOD FOR SUPPORTING PMIPV6 IN NEXT GENERATION NETWORKS

(75) Inventors: Yoo Hwa Kang, Daejeon (KR); Boo Geum Jung, Daejeon (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 643 days.

(21) Appl. No.: 12/554,852

(22) Filed: Sep. 4, 2009

(65) Prior Publication Data

US 2010/0162360 A1  Jun. 24, 2010

(30) Foreign Application Priority Data

Dec. 19, 2008 (KR) .................. 10-2008-0130714

(51) Int. Cl.
*G06F 7/04* (2006.01)
(52) U.S. Cl. .............. 726/3; 726/4; 726/5; 726/6; 726/7
(58) Field of Classification Search .................. None
See application file for complete search history.

(56) References Cited

U.S. PATENT DOCUMENTS

| | | | | |
|---|---|---|---|---|
| 2006/0002426 | A1* | 1/2006 | Madour | 370/477 |
| 2008/0176560 | A1 | 7/2008 | Dutta et al. | |
| 2008/0207168 | A1* | 8/2008 | Forsberg | 455/411 |
| 2008/0207206 | A1* | 8/2008 | Taniuchi et al. | 455/436 |
| 2009/0016364 | A1* | 1/2009 | Krishnan | 370/401 |
| 2009/0040964 | A1* | 2/2009 | Zhao et al. | 370/328 |
| 2009/0122750 | A1* | 5/2009 | Sarikaya | 370/328 |
| 2009/0310564 | A1* | 12/2009 | Kim et al. | 370/331 |

FOREIGN PATENT DOCUMENTS

| | | |
|---|---|---|
| KR | 20070021045 | 2/2007 |
| KR | 20080052298 A | 6/2008 |
| WO | WO2008/046655 | * 4/2008 |

OTHER PUBLICATIONS

Kim (Geunhyung Kim, "Low Latency Cross Layer Handover Scheme in Proxy Mobile IPv6 Domain", ruSMART '08 Proceedings of the 8th international conference, NEW2AN and 1st Russian Conference on Smart Spaces, ruSMART on Next Generation Teletraffic and Wired/Wireless Advanced Networking, ISBN 540854991, Oct. 2008).*
ETSI-TS (ETSI TS 187 003 V1.7.1, "Telecommunications and Internet converged Services and Protocols for Advanced Networking (TISPAN); NGN Security; Security Architecture", Feb. 2008).*
King et al. Mobility Managemtn for All-IP Mobile Networks: Mobile IPv6 vs Proxy Mobile IPv6, IEEE Wireless Communications, 1536-1284, Apr. 2008.*
Mainwaring, What has still to be Deinfed? Network Attachment Subsystem and Protocols, ITU-T/ITU-D Workshop "Standaridzation and Development of Next Generation Networks", Dar es Salaam, Oct. 2006.*
RFC 3775: Johnson et al. Mobility Support in IPv9, Jun. 2004.*

(Continued)

*Primary Examiner* — Peter Poltorak
(74) *Attorney, Agent, or Firm* — Rabin & Berdo, P.C.

(57) ABSTRACT

Provided are a user authentication apparatus and method for supporting PMIPv6 (Proxy Mobile Internet Protocol version 6) in next generation networks. Authentication and mobility signaling protocol can be performed without having an additional signaling process when a mobile terminal moves by extending user profiles of the next generations to support the PMIPv6.

5 Claims, 4 Drawing Sheets

OTHER PUBLICATIONS

Sotot, "PMIPv6: A Network-Based Localized Mobilty Management Solution", The Internet Protocol Journal, vol. 13 No. 3, Sep. 2010.*

Lee et al. ("AROSP: Advanced Route Optimization Scheme in PMIPv6 Networks for Seamless Multimedia Service", IJCSNS International Journal of Computer Science and Network Security, vol. 8 No. 9, Sep. 2008).*

S. Gundavelli, Ed. et al., "Proxy Mobile IPv6", Network Working Group, Request for Comments: 5213, Aug. 2008.

"Proposal for additional data of user profile to support Proxy MIPv6", International Telecommunication Union, Sep. 1-11, 2008.

* cited by examiner

FIG. 2

| Field | Characteristic | User profile |
|---|---|---|
| 201~ Identifier of mobile terminal | essential | permanent |
| 203~ IPv6 address of local mobility anchor | essential | permanent |
| 205~ IPv6 home network prefix of mobile terminal | selective | temporary |
| 207~ IPv6 home network prefix lifetime of mobile terminal | selective | temporary |
| 209~ Address setting mode (Stateful, Stateless or both) | selective | temporary |

FIG. 3

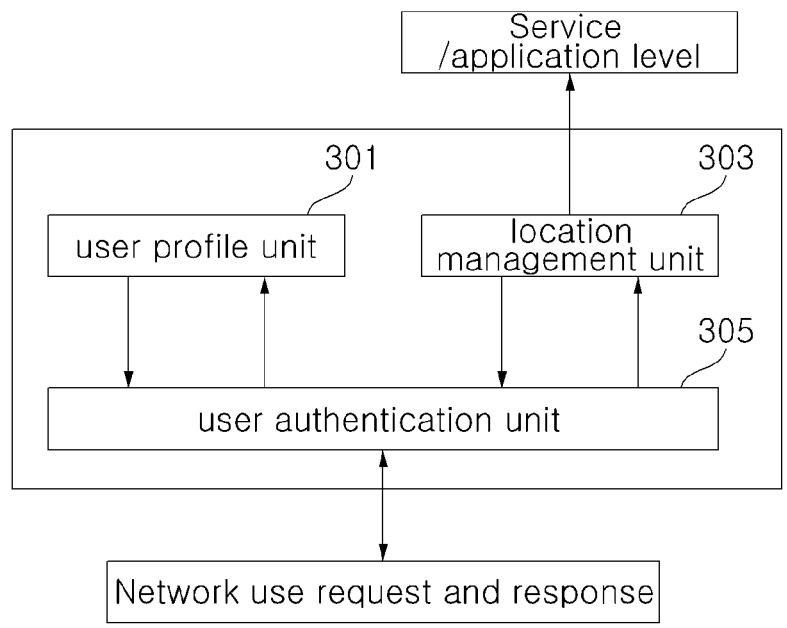

USER AUTHENTICATION APPARATUS AND METHOD FOR SUPPORTING PMIPV6 IN NEXT GENERATION NETWORKS

CROSS-REFERENCE TO RELATED APPLICATION

This application claims the benefit of Korean Application No. 2008-0130714, filed on Dec. 19, 2008 in the Korean Intellectual Property Office, the disclosure of which is incorporated herein by reference.

BACKGROUND OF THE INVENTION

1. Field of the Invention

The present invention relates to a technique of supporting wireless networks in next generation networks, and more particularly, to a user authentication apparatus and method for supporting PMIPv6 (Proxy Mobile Internet Protocol version 6) in next generation networks.

2. Discussion of the Related Art

A next generation network is an audio and voice integrated network which unifies all communication networks including general telephone networks, ATM (Asynchronous Transfer Mode) networks, frame relays, private networks, wireless communication networks, etc. as a packet based common network to reduce network constructing and operating costs and provide a flexible and open network solution and various applications.

User terminal based MIP (Mobile IP) and network based PMIPv6 (Proxy Mobile IP version 6) are representative of a signaling technique for providing mobility. The PMIPv6 was decided as a standard of 3GPP ($3^{rd}$ Generation Partnership Project). Since next generation networks are managed IP networks which provide QoS (Quality of Service) or network security, distinguished from the present Internet, the network based PMIPv6 is more suitable for the next generation networks than the user terminal based mobile IP for supporting mobility in terms of easiness of maintenance.

Next generation network release 2 considers expansion of mobility and standardization for mobility architecture for the expansion of mobility is in progress. To provide mobility of the next generation networks, even a signaling protocol providing mobility and mobility of service level as well as the mobility architecture must be considered. In particular, the next generation networks are integrated into an IP based single network even though different networks are operated for different services, and thus an IP based mobility signaling protocol must be required in order to provide mobility.

To support the PMIPv6 in the next generation networks, authentication of the next generation network and the PMIPv6 must be performed in connection with each other. In the next generation networks, users are authenticated and only users who have the authority to access the next generation networks can use the next generation networks.

The next generation networks provide authentication at a connection level according to NACF (Network Attachment Control Function) and authentication at a service/application level according to use of SIP (Session Initiation Protocol). The NACF performs user registration and initialization at the connection level and carries out identification and authentication of a network level, IP management of connected networks, and authentication of connection and session. Furthermore, the NACF stores a user profile and records data representing service types of users. The NACF notifies an SIP server on IMS (Internet protocol Multimedia Subsystem) of authentication related information.

To support the PMIPv6 in the next generation networks, the next generation networks must operate in relation to authentication of the connection level, and thus the next generation networks are required to operate in connection with the NACF. Accordingly, the user profile of the NACF must be extended such that the user profile includes mobility related information. Furthermore, it is required to connect an authentication process to a PMIPv6 signaling protocol such that an access process including user authentication is performed in connection with the mobility signaling protocol even when a mobile terminal moves.

SUMMARY OF THE INVENTION

It is an object of the present application to provide a user authentication apparatus and method for supporting the PMIPv6 in next generation networks, which extend the existing user profile and links authentication of the next generation networks to a PMIPv6 mobility signaling protocol to support the PMIPv6 in the next generation networks.

According to an aspect of the present application, there is provided a user authentication unit for supporting the PMIPv6 in a next generation network, which comprises a profile management unit storing a user profile including PMIPv6 signaling information of a mobile terminal, a user authentication unit authenticating the mobile terminal when the mobile terminal wants to use the network by using the user profile and transmitting an address to be used by the mobile terminal and the signaling information when successfully authenticating the mobile terminal, and a location management unit having the address to be used by the mobile terminal, position information of the mobile terminal and a privacy protecting method and providing the position information of the mobile terminal to a service which requests the position information of the mobile terminal with reference to the privacy protecting method.

According to another aspect of the present application, there is provided a user authentication method for supporting PMIPv6 in a next generation network, which comprises receiving a request for authentication of use of the network from a mobile terminal, extracting the ID of the mobile terminal from the request and authenticating the mobile terminal by using a user profile corresponding to the ID, and allocating an IP address to the mobile terminal and storing location information of the mobile terminal, which includes the IP address, the ID, position information of the mobile terminal and a privacy protecting method.

According to the present application, user profiles of the next generation networks are extended to support the PMIPv6, and thus authentication and mobility signal protocol can be performed without having an additional signaling process when a mobile terminal moves.

BRIEF DESCRIPTION OF THE DRAWINGS

The accompanying drawings which are included to provide a further understanding of the invention and are incorporated in and constitute a part of this application, illustrate embodiment(s) of the invention and together with the description serve to explain the principle of the invention. In the drawings:

FIG. 2 is a table representing extended items of a user profile to be used to link a next generation network to the PMIPv6 according to the present invention;

FIG. 3 is a block diagram of a user authentication apparatus for supporting the PMIPv6 in a next generation network according to an embodiment of the present invention;

DETAILED DESCRIPTION OF THE PREFERRED EMBODIMENTS

Hereinafter, embodiments of the present invention will be described below with reference to the accompanying drawings.

A user authentication apparatus and method for supporting the PMIPv6 in a next generation network according to the present invention will now be explained.

Policy profile information for the PMIPv6 is added to a user profile for authentication, a policy profile is added in an authentication process and transmitted in a next generation network such that the information can be used for PMIPv6 signaling following the authentication process. Accordingly, the policy profile transmitted through the authentication process is used when a PMIPv6 based mobility procedure is performed. Furthermore, the policy profile information is stored in a location management unit in NACF and can be used when a service level requires user information.

Figure 1:
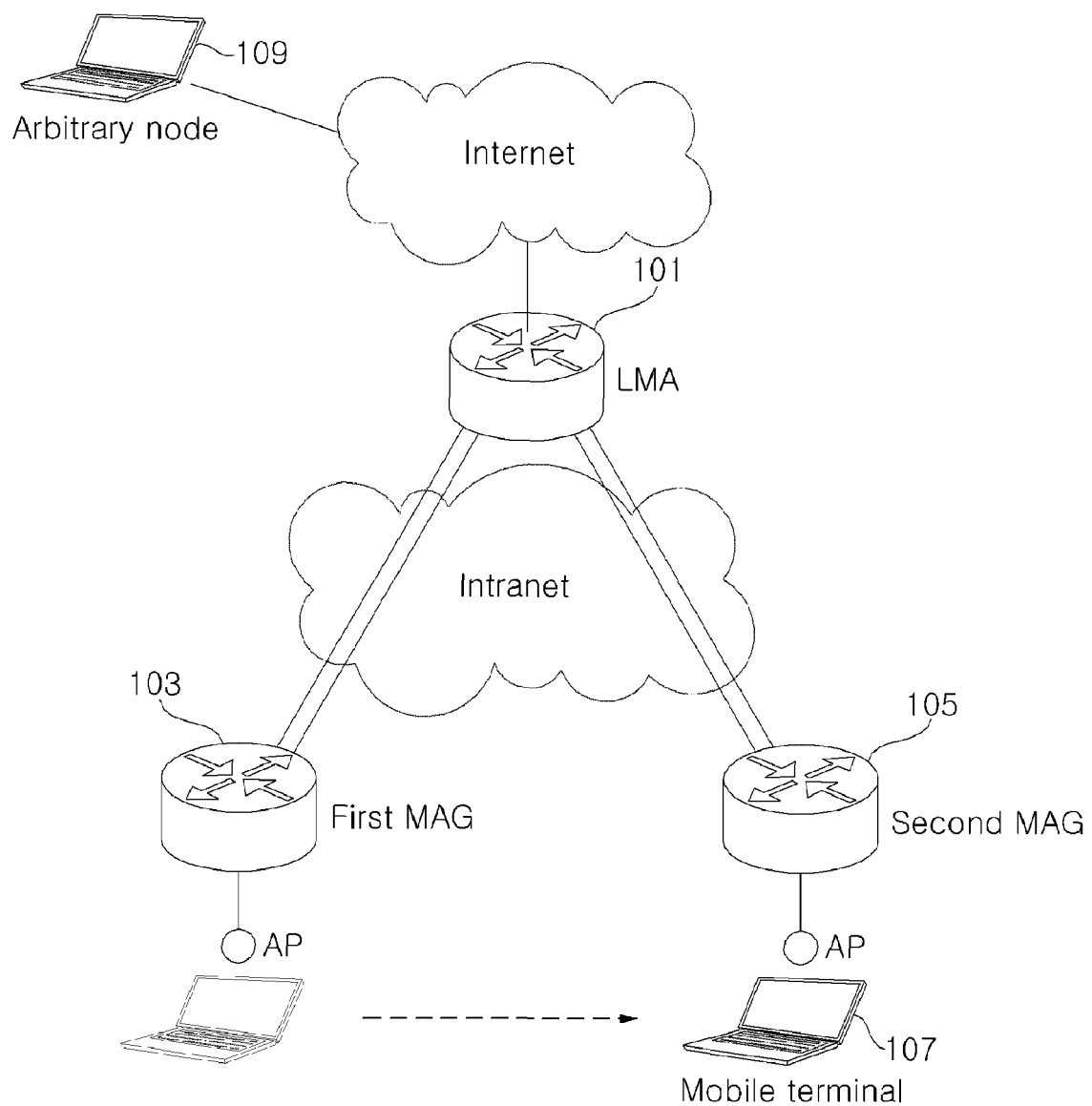
FIG. 1 illustrates a basic flow of signaling for providing mobility in PIMPv6.

FIG. 1 illustrates a basic flow of signaling for providing mobility in the PIMPv6.

MIPv6, a client based mobility protocol, supports a mobility protocol in a mobile terminal. Accordingly, mobile terminals which can use the network are limited. However, the PMIPv6 is a network based mobility protocol and supports mobility in the network, and thus the PMIPv6 supports network services irrespective of whether mobile terminals support a mobility protocol.

To provide mobility in the PMIPv6, an LMA (Localized Mobility anchor) 101, a first MAG (Mobility Access Gateway) 103 and a second MAG 105 are required. The LMA 101 operates as a kind of HA (Home Agent) for a mobile terminal 107 in an access network. The first and second MAGs 103 and 105 support mobility in substitution for the mobile terminal.

A method of providing mobility in the PMIPv6 will now be explained.

When the mobile terminal 107 is connected to the first MAG 103 located in the access network, the first MAG 103 advertises the mobile terminal 107 of a network prefix and an IP address is allocated to the mobile terminal 107 by using the network prefix. The first MAG 103 registers the IP address thereof and the IP address allocated to the mobile terminal in the LMA 101. The LMA 101 stores binding information on the IP address of the mobile terminal 107 and the IP address of the first MAG 103 by using the information registered therein. Furthermore, the first MAG 103 stores binding information on the IP address of the mobile terminal 107 and the IP address of the LMA 101. Accordingly, a tunnel for the mobile terminal 107 is established between the LMA 101 and the first MAG 103 and traffic exchanged between the mobile terminal 107 and an arbitrary node 109 is transmitted using the tunnel.

When the mobile terminal 107 moves to a new network, the second MAG 105 advertises the mobile terminal 107 of the same network prefix as that provided by the first MAG 103. The mobile terminal 107 receiving the network prefix is considered to be located in the same network because the mobile terminal 107 receives the same network prefix even though the mobile terminal 107 moves. That is, there is no need for the mobile terminal 107 to perform any additional operation because the mobile terminal 107 moves in the same network. The second MAG 105 registers the IP address thereof and the IP address of the mobile terminal 107 in the LMA 101 and stores binding information on the IP addresses of the LMA 101 and the mobile terminal 107. The LMA 101 corrects entries related to the mobile terminal 107 from the first MAG 103 to the second MAG 105 by using the binding information. The tunnel for the mobile terminal 107 is changed from the tunnel between the LMA 101 and the first MAG 103 to a tunnel between the LMA 101 and the second MAG 105. By using this method, it is possible to provide mobility of the mobile terminal in the network even if the mobile terminal has no additional function related to movement.

FIG. 2 is a table representing items added to a user profile to be used to link a next generation network to the PMIPv6 according to the present invention.

The user profile includes the ID 201 of a mobile terminal, LMA IPv6 address 203 of the mobile terminal, IPv6 home network prefix 205 of the mobile terminal, IPv6 home network prefix lifetime 207 of the mobile terminal, and address setting mode 209.

The ID 201 is an identification value of the mobile terminal connected to the next generation network and used to discriminate the mobile terminal from other mobile terminals. The mobile terminal ID 201 is permanently stored in the user profile while the next generation network manages the mobile terminal.

The LMA IPv6 address 203 of the mobile terminal 203 corresponds to the IPv6 address of the LMA 101 for providing mobility to the mobile terminal in the PMIPv6, which is described with reference to FIG. 1. A tunnel for maintaining a network between the mobile terminal and an arbitrary node communicating with the mobile terminal is managed through the LMA when the mobile terminal moves. The IPv6 address 203 is permanently stored in the user profile while the next generation network manages the mobile terminal.

The IPv6 home network prefix 205 of the mobile terminal stores a network prefix advertised by the first MAG of a wireless network to which the mobile terminal is initially connected. The mobile terminal receives the same home network prefix as the IPv6 home network prefix 205 even when the mobile terminal moves to connect to the second MAG and can use the wireless network in the same environment.

The IPV6 home network prefix lifetime 207 of the mobile terminal is an item that represents an effective period of the IPv6 home network prefix of the mobile terminal. After the effective period is finished, the prefix of an MAG to which the mobile terminal is currently connected is registered as a prefix of a home network to which the mobile terminal is initially connected.

The address setting mode 209 represents a method of setting an IP address used by the mobile terminal. The address setting mode 209 includes Stateful, Stateless and Both.

FIG. 3 is a block diagram of a user authentication apparatus for supporting the PMIPv6 in a next generation network according to an embodiment of the present invention.

The user authentication apparatus for supporting the PMIPv6 in the next generation network includes a user profile unit 301, a location management unit 303 and a user authentication unit 305.

The user profile unit 301 stores a user profile used in the next generation network. The user profile stores service contents for each user. Furthermore, the user profile includes items added to link the next generation network to the PMIPv6 for supporting PMIPv6, illustrated in FIG.

The location management unit 303 stores user location information including an IP address allocated to a mobile terminal, position information of the mobile terminal in the network and a user privacy handling method. The stored user location information is used when user information is required at the service level.

The user authentication unit 305 requests the user profile unit 301 to provide a user file corresponding to the mobile terminal when receiving a request for using the network from the mobile terminal and authenticates the mobile terminal by using the user profile transmitted from the user profile unit 301. When the user authentication unit 305 successfully authenticates the mobile terminal, the user authentication unit 305 allocates an IP address to the mobile terminal. The allocated IP address is transmitted to the mobile terminal together with the items for PMIPv6 signaling included in the user profile, described with reference to FIG. 2.

Figure 4:
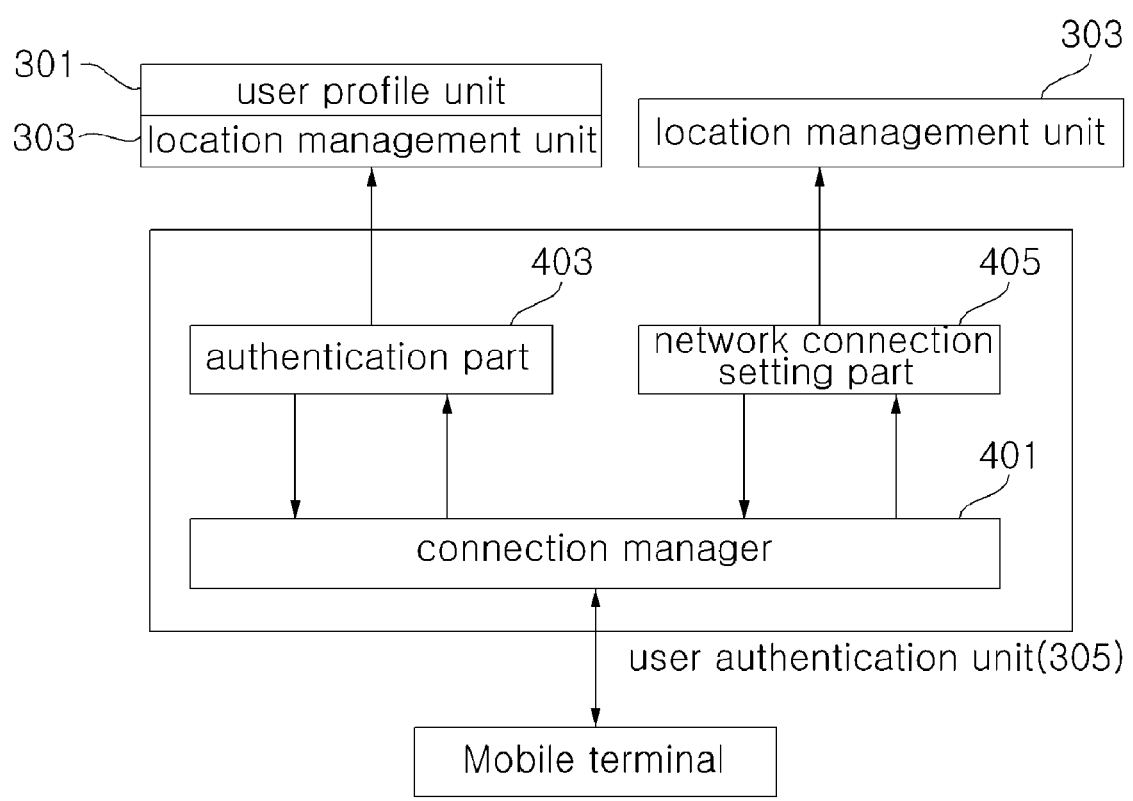
FIG. 4 is a block diagram of a user authentication unit illustrated in FIG. 3.

FIG. 4 illustrates a configuration of the user authentication unit 305 illustrated in FIG. 3 according to an embodiment of the present invention.

The use authentication unit 305 includes a connection manager 401, an authentication and approval part 403 and a network connection setting part 405.

The connection manager 401 receives a request for using the network from the mobile terminal, extracts the ID of the mobile terminal from the received request and transmits the ID to the authentication and approval part 403. In addition, the connection manager 401 transmits an IP address to be used by the mobile terminal, which is received from the network connection setting part 405, to the mobile terminal when the mobile terminal has the authority to use the network.

The authentication and approval part 403 requests the user profile unit 301 to provide the user profile of the mobile terminal by using the ID of the mobile terminal, transmitted from the connection manager 401. The authentication and approval part 403 authenticates the mobile terminal by using the user profile received from the user profile unit 301 and transmits the authentication result to the network connection setting unit 405 and the location management unit 303.

The network connection setting unit 405 allocates the IP address to the mobile terminal when the authentication and approval part 403 successfully authenticates the mobile terminal and transmits the allocated IP address to the connection manager 401 and the location management unit 303.

Figure 5:
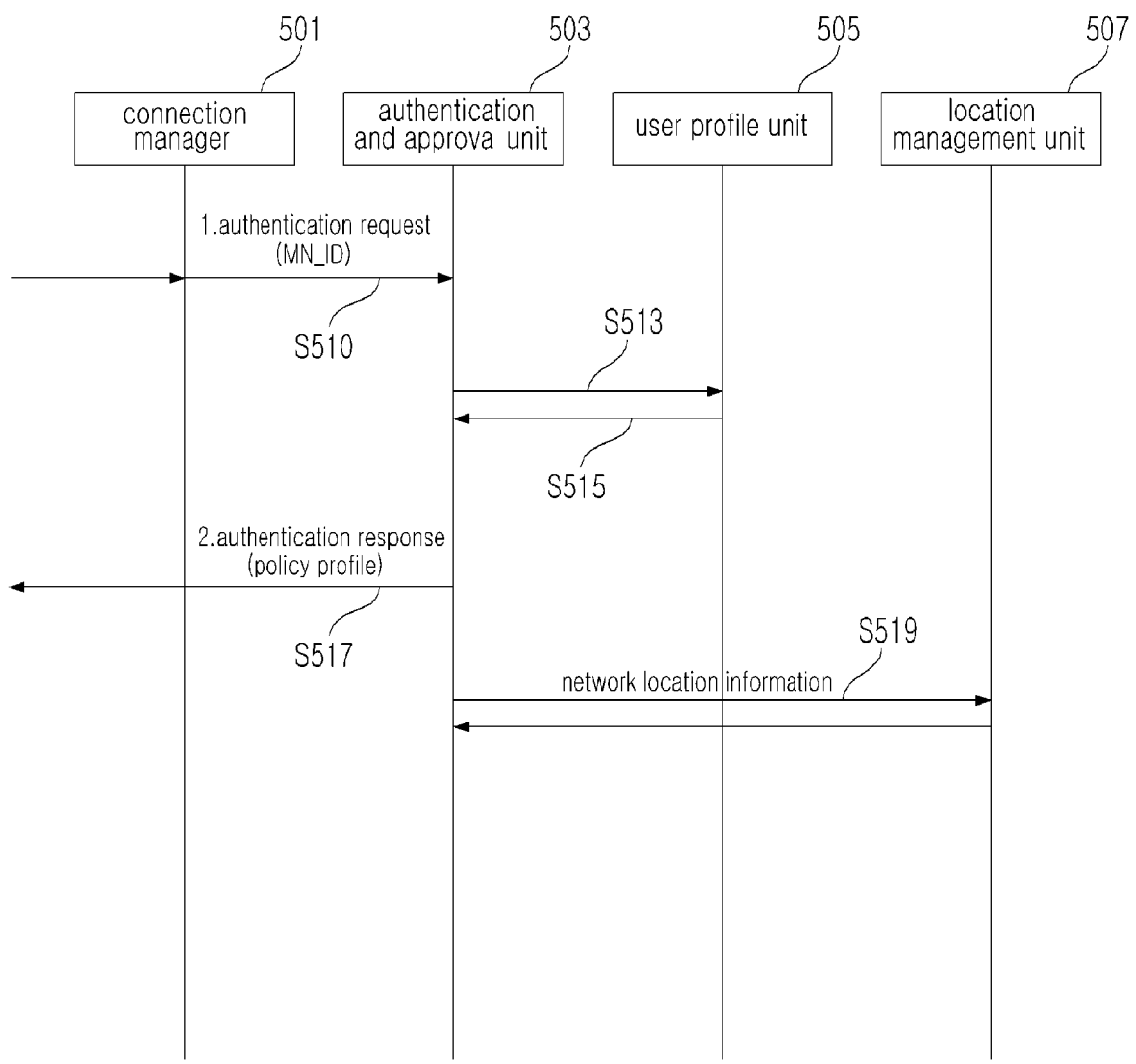
FIG. 5 is a flowchart illustrating a user authentication method for supporting the PMIPv6 in a next generation network according to an embodiment of the present invention.

FIG. 5 is a flowchart illustrating a user authentication method for supporting the PMIPv6 in a next generation network according to an embodiment of the present invention.

A mobile terminal or a mobility control system requests a connection manager 501 of a user authentication unit in order to use the network in step S510. An authentication and approval unit 503 of the user authentication unit transmits the ID of the mobile terminal to a user profile unit 505 in step S513. The user profile unit 503 extracts a user profile of the mobile terminal by using the ID of the mobile terminal and transmits the extracted user profile to the authentication and approval unit 503 of the user authentication unit in step S515.

The authentication and approval unit 503 of the user authentication unit authenticates the mobile terminal by using the user profile and allocates an IP address to the mobile terminal when successfully authenticates the mobile terminal. A connection manager 501 of the authentication unit transmits the IP address of the mobile terminal and information for PMIPv6 signaling, which is included in the user profile, to the mobile terminal or the mobility control system in step S517.

Furthermore, the authentication and approval unit 503 of the user authentication unit transmits the IP address allocated to the mobile terminal to a location management unit 507 and the location management unit 507 stores the IP address together with position information of the mobile terminal in step S519.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A user authentication apparatus for supporting PMIPv6 (Proxy Mobile Internet Protocol version 6) in a next generation network, comprising:
   a profile management unit storing a user profile including identification information and PMIPv6 signaling information of a mobile terminal;
   a user authentication unit that,
      responsive to a request for using the network from the mobile terminal, transmits the identification information of the mobile terminal to the profile management unit, retrieves the user profile corresponding to the identification information from the profile management unit, and authenticates the mobile terminal using the retrieved user profile, and
      upon successful authentication of the mobile terminal, allocates an IP address to the mobile terminal, and transmits the IP address and the PMIPv6 signaling information obtained from the retrieved user profile to the mobile terminal; and
   a location management unit storing the allocated IP address of the mobile terminal and position information of the mobile terminal.

2. The user authentication apparatus of claim 1, wherein the user authentication unit comprises:
   a connection manager receiving the request for using the network from the mobile terminal;
   an authentication and approval part authenticating the mobile terminal using the retrieved user profile; and
   a network connection setting part allocating the IP address to the mobile terminal.

3. The user authentication apparatus of claim 1, wherein the user profile further includes identification information of an LMA (Local Mobility Anchor) to which the mobile terminal connects.

4. The user authentication apparatus of claim 1, wherein the user profile further includes an IPv6 home network prefix of the mobile terminal, the lifetime of the prefix and an address setting mode.

5. The user authentication apparatus of claim 1, wherein the a location management unit further stores a privacy protecting method, and provides the position information of the mobile terminal to a service that requests the position information with reference to the privacy protecting method.

* * * * *